United States Patent
D'Amico et al.

(10) Patent No.: US 8,807,057 B2
(45) Date of Patent: Aug. 19, 2014

(54) LOAD TRANSFER DEVICE FOR SEED DISTRIBUTION SYSTEMS IN SEEDERS AND FERTILIZER MACHINES

(75) Inventors: Juan Pablo D'Amico, Buenos Aires (AR); Mario Omar Tesouro, Buenos Aires (AR); Angel Romito, Buenos Aires (AR); Marcos Andres Roba, Ciudad Autonoma de Bs.As. (AR)

(73) Assignee: Instituto Nacional de Tecnologia Agropecuaria, Ciudad de Buenos Aires (AR)

( * ) Notice: Subject to any disclaimer, the term of this patent is extended or adjusted under 35 U.S.C. 154(b) by 235 days.

(21) Appl. No.: 13/441,758

(22) Filed: Apr. 6, 2012

(65) Prior Publication Data

US 2012/0256391 A1    Oct. 11, 2012

(30) Foreign Application Priority Data

Apr. 7, 2011  (AR) .............................. P20110101176

(51) Int. Cl.
*A01C 14/00*    (2006.01)

(52) U.S. Cl.
USPC ............................................ 111/63; 111/927

(58) Field of Classification Search
USPC ............................................... 111/927, 52–69
See application file for complete search history.

(56) References Cited

U.S. PATENT DOCUMENTS 6,530,334 B2 *   3/2003   Hagny ........................... 111/189

* cited by examiner

*Primary Examiner* — Christopher J Novosad
(74) *Attorney, Agent, or Firm* — Muncy, Geissler, Olds & Lowe, P.C.

(57) ABSTRACT

The movement along the ground in seed and fertilizer distribution systems of seeder and fertilizer machines is improved by a load transfer device comprising a deformable parallelogram-shaped structure attached to the machine tool holder bar at one end and to the distribution system at the other end, and a transfer rack that articulates in one of the parallelogram vertexes acting as a rocker arm. The rocker arm is connected at one end to the parallelogram and at the other end to at least one spring through a lever arm that extends downwardly and divergently, generating a crossing angle between the parallelogram lower un upper sides, creating a torque that varies not only for the spring tension by also for the ratio of the effective lengths of the involved lever arms.

8 Claims, 2 Drawing Sheets

LOAD TRANSFER DEVICE FOR SEED DISTRIBUTION SYSTEMS IN SEEDERS AND FERTILIZER MACHINES

FIELD OF THE INVENTION

The present invention refers to improvements in load transfer devices for seed distribution systems in seeder and fertilizer machines.

BACKGROUND OF THE INVENTION

Associated with direct seeding and non-till culture or farming, the irregularity of the ground surface becomes important as conditioning aspect for appropriate seeding work.

In this sense, the capacity of the machine to overcome this limitation in association with other no less critical limitations such as the consistency of the ground and crop residues, turn out to be relevant.

There are two critical aspects to be considered in seed distribution systems, the possibility of moving vertically in order to correctly go along the irregularities presented by the ground surface, and in parallel, the need to have sufficient load on the body or seeding unit to introduce seeds uniformly to the desired working depth on the ground.

In this sense, longer linking and joint means favor moving along the ground, but affect the geometry of the machine making it too long and wide for transportation and, on the other hand, hinder the transfer of loads to the distribution system or seeding units.

In direct seeding productive situations where there is little or no chance that the irregularities of the ground surface, mainly wheel tracks produced during harvest, will become even so that at the time of seeding, the ground profile has a more regular surface, the troublesome situation of variability in the load transferred is critical conditioning seeding uniformity and depth, and seed-ground contact.

Load transfer systems of the great majority of seeders are based on mechanical principles using springs as active means.

These systems pose the disadvantage that when the spring tension increases the load transferred is often too excessive for the agronomic needs of the work and when the spring is relaxed they tend to be sub-optimal. This variation in the load magnitudes constantly occurs because the seeding system goes on an uneven ground surface thus articulating the deformable parallelogram which makes the spring tighten and relax.

This variability not only affects the quality of the seeding work, but it also conditions the life cycle of the distribution system components that bear point loads implying important efforts.

There are various systems in the prior art intended to overcome this problem. Some of these systems present pneumatic or oil-pneumatic solutions, which are not widely spread due to their high cost, thereby making seeder machines considerably more expensive. There is currently no standard machine available in the national market that uses pneumatic or hydraulic devices for such purpose.

Some systems that attempt to solve these problems without the use of pneumatic or oil-pneumatic solutions are also known. Among these, for example, those disclosed in Patent Applications AR 050878 A1 and JP 2003-125611 A can be cited. The solutions provided by such documents are considerably complex, thereby making the product more expensive, and the maintenance and regulation thereof much more complicated.

Consequently, there is an unfulfilled need for improved load transfer systems in seed distribution systems in order to overcome the problems mentioned above, especially the great variability in the load transferred when moving, providing a device that does not use hydraulic or pneumatic systems and which in turn is simple and ease to maintain.

SUMMARY OF THE INVENTION

It has been found, and it is the object of the present invention, that the problems of the prior art systems mentioned above can be eliminated, by redesigning the geometry of the lever arms and deformable parallelograms used as articulation means in seeders. Thus, it is possible to achieve a greater uniformity of the load transferred even when springs are employed.

Accordingly, the present invention provides improvements in load transfer devices for seed distribution systems in seeder machines. Such devices are based on deformable parallelogram systems associated with springs, and the improvements consist in changes in the shape of the transfer lever arms which link the deformable parallelogram with the spring.

The present invention permits to achieve a crossing angle between both elements changing the geometry of the levers, generating a torque which varies not only by the spring tension but also by the ratio of the effective lengths of the levers involved.

Consequently, it is an object of the present invention a load transfer device for seed distribution systems in seeder and fertilizer machines which improves the adaptation of the seed distribution systems to the different irregularities of the ground, such device comprising a deformable parallelogram-shaped structure attached to the tool-holder bar of such seeder and fertilizer machine at one end and to the distribution system at the other end;

a transfer rack that articulates in one of the vertexes of the parallelogram acting as a rocker arm connected at one end to the aforementioned parallelogram and at the other end to at least one spring through a lever arm;

wherein such lever arm extends downwardly and divergently, generating a crossing angle between the lower and upper sides of the parallelogram which creates a torque that varies not only due to the spring tension but also to the ratio of the effective lengths of the lever arms involved.

For the purposes of this application, the terms "divergently" and "oblique", used interchangeably, indicate that the lever arm extends forming an angle departing from the direction of the corresponding sides of the parallelogram-shaped structure.

In a preferred embodiment of the invention, the crossing angle is at least 35°.

In a more preferred embodiment of the invention, the crossing angle is at least 40°.

In a yet more preferred embodiment of the invention, the crossing angle is 45°.

It is a further object and aspect of the invention a seeder and fertilizer machine comprising a load transfer device for seed distribution systems which improves the adaptation of the seed distribution systems to the different irregularities of the ground, such device comprising a deformable parallelogram-shaped structure attached to the tool-holder bar of such seeder and fertilizer machine at one end and to the distribution system at the other end;

a transfer rack that articulates in one of the vertexes of the parallelogram acting as a rocker arm connected to the aforementioned parallelogram and to at least one spring through a lever arm;

wherein such lever arm extends downwardly and divergently, generating a crossing angle between the lower and upper sides of the parallelogram which creates a torque that varies not only due to the spring tension but also to the ratio of the effective lengths of the lever arms involved.

In a preferred embodiment of this aspect of the invention, the crossing angle is at least 35°.

In a more preferred embodiment of this aspect of the invention, the crossing angle is at least 40°.

In a yet more preferred embodiment of this aspect of the invention, the crossing angle is 45°.

DETAILED DESCRIPTION OF THE INVENTION

Figure 1:
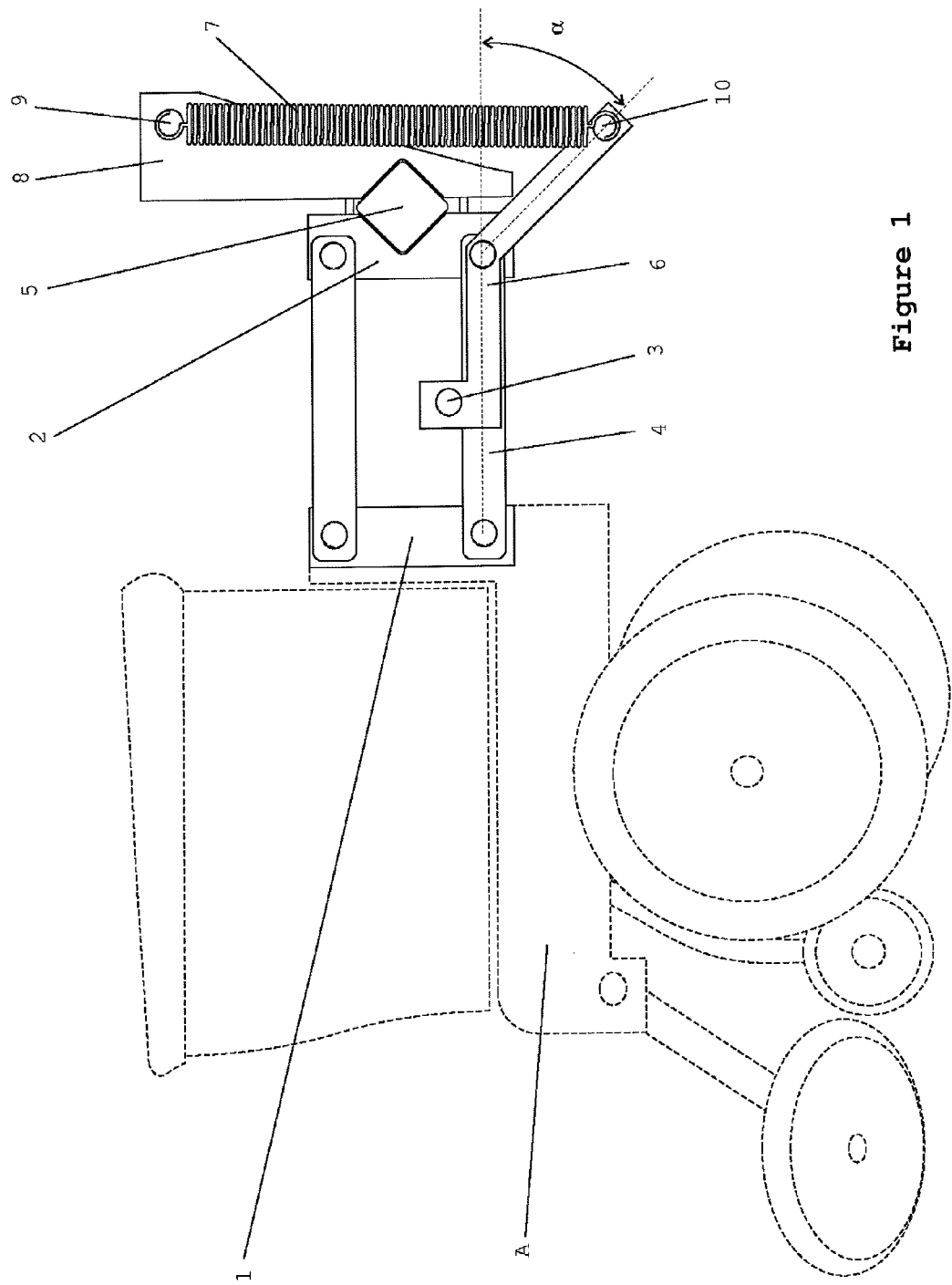
FIG. 1 is a scheme of a side view of the device of the present invention with the seeder machine in a normal position on the ground.

The invention relates to improvements in load transfer systems of the seed distribution systems. Such improvements, in order to maintain certain constancy in the transferred load and considering that the spring tension varies linearly when it stretches, are achieved by establishing a certain crossing angle so as to change the size ratio of the lever arms involved, and to reduce the transferred load when the spring is under great tension, and otherwise to increase the transferred load. Thus, by introducing the improvements of the present invention, an enhanced performance of commercial equipment can be obtained mainly based on design modifications that do not necessarily involve higher manufacture costs or add complexity to the system.

The system of the present invention eliminates the problem that the transferred load varies depending on the position of the seeding unit as the spring tension varies.

The invention will now be described in further detail referring to the figures appended to the present disclosure showing a preferred embodiment of the invention. In the different figures, the same reference numerals are used to identify the same elements.

Referring to FIG. 1, a scheme of the device of the invention is shown wherein the distribution system A is in normal working position and is linked to the rear side 1 of the deformable parallelogram, which is in turn fixed by its front side 2 to the tool-holder bar 5 of the seeder machine. On this bar, the upper fixation 8 is also fixedly mounted, to which one of the ends of the spring 7 is fixed by a bolt 9. The other end of the spring is fixed by a bolt 10 to the oblique, divergent, lever arm of the transfer rack 6, which being arranged adjacent to the lower arm of the parallelogram, is linked thereto via a through-bolt 3. The crossing angle formed between the lever arm of the transfer rack 6 and the projection line of the lower side of the deformable parallelogram 4 is symbolized by the broken lines and the letter α.

The crossing angle can have any value greater than 0°, such as for example 10°, 20°, 30°, 40° or 50° and their intermediate values, preferably being greater than or equal to 35°, and more preferably greater than or equal to 40°, and even more preferably equal to 45°.

Figure 2:
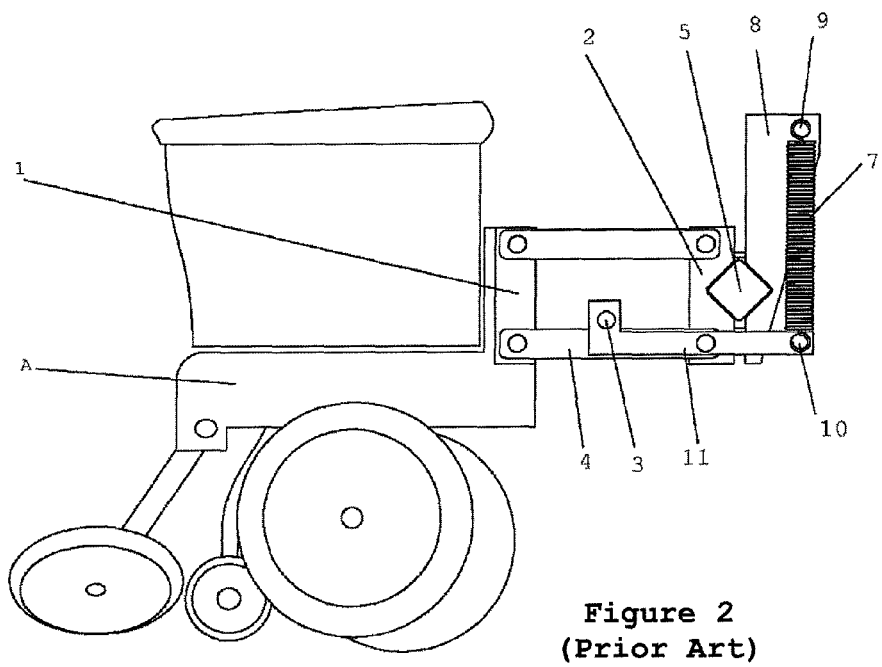
FIG. 2 is a scheme of a side view of a prior art device, as marketed in Argentina.

Referring to FIG. 2, a prior art device where the distribution system A is in normal working position is shown. Common elements are identified with the same reference numerals as those used in FIG. 1 for the present invention. Transfer rack 11, substantially straight, does not present a crossing angle with respect to the lower side of the deformable parallelogram. This is the substantial difference of the device of the present invention and provides a beneficial technical effect.

Figures 3, 4:
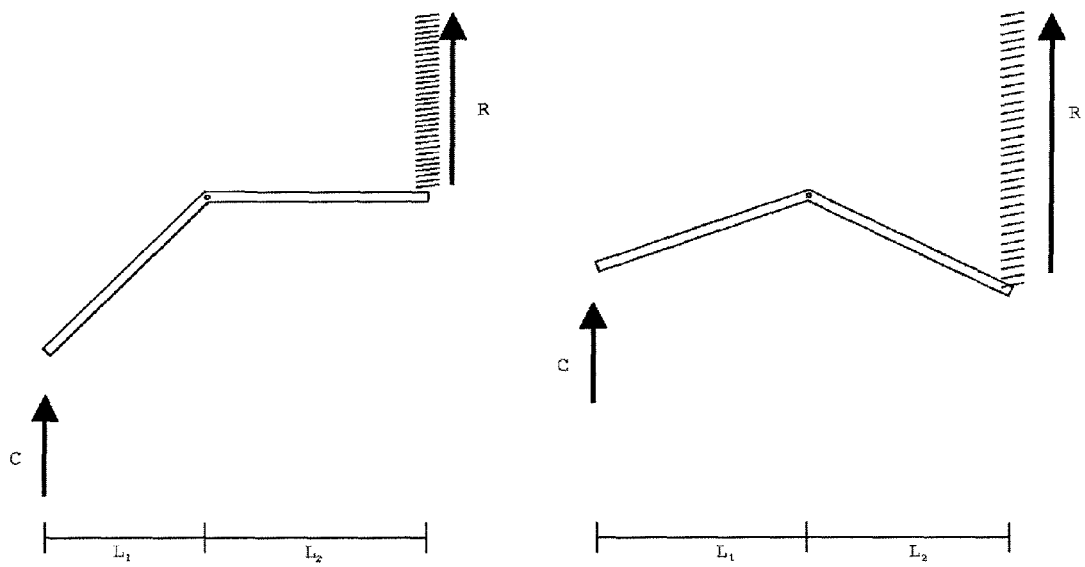
FIGS. 3 and 4 illustrate a scheme of the mechanics of the forces transferred by arranging an oblique rocker arm as that used in the present invention.

For better understanding of the concept which underlies the novelty and advantages of the present invention over prior art devices, FIG. 3 and FIG. 4 show a representation of the transfer of efforts made by an oblique rocker arm when the vectors of the applied forces practically keep their constant direction.

Considering that when in equilibrium, the rocker arm wiggles on fixed point O, when torqued from the end of arm $L_2$, by the force R of spring, more or less vertical, a torque is generated which will be balanced by the force C applied at the end of arm $L_1$ which presents an inclination angle α with respect to arm $L_2$ The equilibrium condition is given by the following equation:

$$C \times L_{1x} = R \times L_{2x}$$

where $L_{1x}$ and $L_{2x}$ represent the horizontal components of lever arms $L_1$ and $L_2$ of the oblique rocker arm.

When the rocker arm wiggles about its pivot point O the same equilibrium condition mentioned remains; but a stretching of the spring is produced, causing increased magnitude of the force R. However, this wiggling also changes the ratio of horizontal components $L_{1x}$ and $L_{2x}$.

Force C constancy is based on a reduction of component $L_{2x}$ and an increase of component $L_{1x}$ as shown in the Figures.

In the present invention, this rocker arm is formed by the transfer rack so that the load transferred to the distribution system is kept stable as with the force C depicted in FIG. 3 and FIG. 4.

Having thus described and illustrated the present invention, various modifications and variations will be apparent to those skilled in the art based on the present description and the ordinary skill in the art. All such modifications and variations will fall within the scope and spirit of the present invention.

The invention claimed is:

1. A load transfer device for seed and fertilizer distribution systems in seeder and fertilizer machines which improves the adaptation of the seed distribution systems to the different irregularities of the ground, such device comprising
a deformable parallelogram-shaped structure attached to the tool-holder bar of such seeder and fertilizer machine at one end and to the distribution system at the other end;
a transfer rack that articulates in one of the vertexes of the parallelogram acting as a rocker arm connected at one end to the aforementioned parallelogram and at the other end to at least one spring through a lever arm;
wherein such lever arm extends downwardly and divergently, generating a crossing angle between the lower and upper sides of the parallelogram which creates a torque that varies not only due to the spring tension but also to the ratio of the effective lengths of the lever arms involved.

2. The device of claim 1, wherein the crossing angle is at least 35°.

3. The device of claim 1, wherein the crossing angle is at least 40°.

4. The device of claim 1, wherein the crossing angle is 45°.

5. Seeder machine comprising at least one tool-holder bar and a seed or fertilizer distribution system connected by fastening means and a load transfer device according to claim 1, said machine comprising:

a deformable parallelogram-shaped structure attached to the tool-holder bar of such seeder and fertilizer machine at one end and to the distribution system at the other end;

a transfer rack that articulates in one of the vertexes of the parallelogram acting as a rocker arm connected at one end to the aforementioned parallelogram and at the other end to at least one spring through a lever arm;

wherein such lever arm extends downwardly and divergently, generating a crossing angle between the lower and upper sides of the parallelogram which creates a torque that varies not only due to the spring tension but also to the ratio of the effective lengths of the lever arms involved.

6. The seeder machine of claim 5, wherein the crossing angle is at least 35°.

7. The seeder machine of claim 5, wherein the crossing angle is at least 40°.

8. The seeder machine of claim 5, wherein the crossing angle is 45°.

* * * * *